United States Patent [19]
Clem

[11] Patent Number: 5,481,968
[45] Date of Patent: Jan. 9, 1996

[54] APPARATUS FOR CONTINUOUS MULTIPLE STREAM DENSITY OR RATIO CONTROL

[75] Inventor: Lyle W. Clem, Algonquin, Ill.

[73] Assignee: Accurate Metering Systems, Inc., Schaumburg, Ill.

[21] Appl. No.: 268,634

[22] Filed: Jun. 30, 1994

[51] Int. Cl.[6] .............................. A23G 9/00; G05D 11/06
[52] U.S. Cl. ................... 99/452; 99/486; 137/91; 137/101.19
[58] Field of Search ............................. 99/452, 486, 453, 99/353, 275; 366/177.1, 160.1, 162.1; 137/4, 91, 101.19

[56] References Cited

U.S. PATENT DOCUMENTS

| | | |
|---|---|---|
| 1,449,458 | 3/1923 | Sutermeister . |
| 2,131,510 | 9/1938 | Gray et al. . |
| 3,036,585 | 5/1962 | Shawhan . |
| 3,726,102 | 4/1973 | Parks . |
| 3,849,074 | 11/1974 | Ficklinger et al. .................. 366/177.1 |
| 4,019,721 | 4/1977 | Langner ............................... 366/160.3 |
| 4,234,007 | 11/1980 | Titone et al. . |
| 4,277,254 | 7/1981 | Hanson . |
| 4,294,277 | 10/1981 | Szeliga . |
| 4,354,762 | 10/1982 | Cantoni ............................... 366/162.1 |
| 4,433,701 | 2/1984 | Cox et al. . |
| 4,483,357 | 11/1984 | Rao et al. . |
| 4,654,802 | 5/1987 | Davis . |
| 4,747,272 | 5/1988 | Howell et al. . |
| 4,930,576 | 6/1990 | Berryman et al. ................... 366/177.1 |
| 5,051,920 | 9/1991 | Reams et al. ............................ 364/509 |
| 5,068,116 | 11/1991 | Gibney et al. . |
| 5,304,390 | 4/1994 | Condron et al. ............................ 137/3 |
| 5,325,852 | 7/1994 | Clem ......................................... 137/91 |
| 5,388,604 | 2/1995 | Clem .......................................... 137/4 |
| 5,407,267 | 4/1995 | Davis et al. ........................... 366/160.1 |

Primary Examiner—Timothy F. Simone
Attorney, Agent, or Firm—Mathew R. P. Perrone, Jr.

[57] ABSTRACT

A multiplicity of variable density fluid streams, each having been processed to yield individual fluid streams of desired densities, are combined in a manner to achieve controlled ratios of each stream as determined by a recipe structure to produce a final mixture of a desired density. This system further allows injection of solids or other pumpable fluids utilizing the same overall control equipment, compensating for displacement to again yield a final mixture to meet a desired weight per unit volume. This system may be utilized to manufacture a variety of products, especially edible foods such as frozen toppings, marshmallows, ice creams and other comestibles. The overall control system hardware may be extended to further control related aspects of process equipment such as heat exchange functions, flowrate, level, pressure, and the like, as may be required to achieve economical utilization of the microprocessor capabilities.

8 Claims, 7 Drawing Sheets 5,481,968

APPARATUS FOR CONTINUOUS MULTIPLE STREAM DENSITY OR RATIO CONTROL

This invention relates to a method and apparatus for adjusting the density and ratio of a mixture, and more particularly to a method and apparatus for processing at least two fluid streams, each stream having been processed to yield an individual fluid stream of desired densities, and then combined in a manner to achieve controlled ratios of each stream as determined by a recipe structure to produce a final mixture of a desired density.

BACKGROUND OF THE INVENTION

Of the standard processes in forming a comestible, a critical feature is having the final product formed from a fluid having the right viscosity and density. In forming a fluid to make the desired product, it necessary at times to mix at least one liquid with at least one gas to form a final liquid. It is also necessary at times to mix at least two liquids of differing viscosities or densities. To either a liquid-gas mixture or a liquid-liquid mixture, it is desirable to add at least one solid such that the fluid to make the final product becomes a slurry.

These different combinations make a fluid or slurry having the right viscosity and density. It is very difficult to control each component to achieve this goal. Such a procedure requires a constant data feedback to provide for adjustments. The adjustments must be available quickly. This is especially true when one desires to have a continuous process.

Control of a gas addition to a fluid stream is required in several processes to create a final fluid characteristic, which is generally of lesser density than the original fluid stream. The actual control means for the gas stream can be accomplished by a variety of approaches. Control of a gas rate by an in-line orifice creating a critical velocity for the gas is known in the art, but does not make use of a primary fluid metering device.

Another method for gas incorporation has air being introduced into a fluid by the fluid flowing through and drawing air into a cylindrical bore at the same time. The air volume is dependent on the rate of the flowing liquid.

Also ambient air may be introduced through a variable opening into a flowing liquid stream. Again the gas addition is varied by outside intervention and is not controlled based upon the flow of the liquid.

Another method determines the relative air or gas content in a product by comparing the relative volumes in a sampling chamber by compressing the sample with a series of movable pistons. This method can be used as a means of measuring the relative volume differences in two sample mixtures of liquid and air, but does not control the rate of the gas addition nor does it operate as a control to continuously control the gas addition rate.

Still another method utilizes a volumetric electromagnetic flowmeter connected to a control circuit to control addition of air to a liquid utilizing air mass flow control. This approach is based upon a volumetric flow metering device and cannot compensate for variations in incoming fluid density by a volumetric metering means. The liquid/air ratio is controlled on a direct volume of liquid to volume of gas basis; and, therefore, will not yield a liquid of desired density, since temperature and mass of the liquid have not been measured.

A further method describes mixing a liquid component with another liquid component based upon a volume measurement from a measuring device. Although addition of one liquid to another may alter the density of the resulting mixture, no means for determining density is provided.

Also, a method allows for addition of a gas to a liquid stream based upon maintaining a gas to liquid ratio by means of pressurizing the gas/liquid mixture. The purpose of this method is to create a carbonated icy beverage which contains gas to an approximate volume. The density of the resulting liquid may vary and does not create a basis for determining the amount of gas which is incorporated into the beverage.

Still another method references introduction of air into a freezing chamber, while monitoring the loading of a dasher motor to maintain a constant desired product density. This continuous process alters the air intake by indirect measurement means and cannot quantify or control the liquid to a desired density setpoint except as determined by external sampling means to effect an alteration of the operating point.

Yet a further method determines the overrun of a frozen product by allowing a batch process to continue whipping air into a frozen product until a motor load setpoint is reached. As a batch process, this does not provide for continuous production of the frozen product and further does not attempt to measure the density of the final mixture.

Mixing of two or more fluid streams is referenced numerous times in prior art. However, nothing in the prior art involves a multiplicity of individual density controlled streams being utilized, so as to yield a final mixture of a desired density.

Other mixing methods for use in the chemical field are not adaptable to food processes. A known fuel dispensing system depends on mechanically interlocked proportioning valves for two streams only and does not measure the density of the resulting mixture. Further no overall flowrate control is included as the dispensing rate is dependent on the external fuel pumps and position of the manual dispensing nozzle. The volumetric flowmeters, which provide volume related information only, are not capable of determining the density of a fluid stream.

A resin foaming process also describes two liquid streams only with volumetric type flowmeters. Ratio control is by means of a servo motor driven needle valve based upon flowrate signals from the flowmeters. Overall flowrate control is manual via the nozzle and there is no requirement for density control of the final foam. The final foam quality is a result of chemical interaction between the resin and foaming agent.

Another resin foaming process references mixing of two streams comprised only of a resin and foaming agent. For similar reasons, this resin foaming application is not based upon density information and does utilize volumetric flowmeters.

The petroleum industry realizes a control of an air to liquified petroleum gas ratio to yield a mixture of comparable heating value equivalency to that of a third stream of natural gas. Although specific gravity of the streams is measured, it is with the purpose of determining the heating equivalency value of each gas stream, which is expressed in heat units per unit volume. The system does not make use of density as the controlled parameter of the final gas mixture. Rather it utilizes the control capability to mix gases to achieve a uniform heating value. Further, overall system flowrate is determined to be that of the rate of gas consumption by the downstream combustion process.

Another non-food application of a mixing apparatus makes specific use of volumetric metering means and does not attempt to determine the final density of a product. The reference to viscosity control is a result of mixing water with a polymer in a controlled ratio to yield a final mixture of desired viscosity without concern for final product density.

Yet another non-food industrial application combines streams of acids of differing specific gravities to yield an acid of a desired specific gravity. No attempt is known relative to controlling the overall system flowrate nor is a recipe followed to create a series of flow ratios for the various acid streams. Additionally there are no adequate devices to create and control the system to an overall flowrate or to generate data related to the totalization of final product mixed.

Still another non-food industrial application makes use of volumetric metering devices on water streams to produce a water/cement slurry of a desired density as monitored by a density meter based upon radiation transmittance through the slurry. Only two streams of water are utilized and the measurement means is not suitable for a food related application. Also a multiplicity of individually density adjusted process streams are not included so as to be combined by a recipe function to determine the mixing ratios.

In the processed food arts, combinations of components to form various foods are desired and even required. When the resulting food must have a desired density, adding streams to be mixed therein geometrically compounds the problem of achieving a certain density within a desired range. It is difficult to obtain a final product comprised of specific ratios of each stream as defined by a recipe structure and to control the possible addition of added ingredients on a mass basis to create a final mixture of a desired density, that is weight per unit volume.

In a multi-stream procedure, a change in recipe also creates major problems. It is desirable to change a recipe simply used in a process in order to switch to a desired food or flavor; and yet maintain a series of recipes with each recipe having information relative to the desired density, production temperature, pressure, and ratio of each process stream. In this fashion, a substantially similar process can be used to form foods having different physical characteristics. The multiple streams used to form the final food multiply the difficulty of such a system.

In such a process, it is desired to obtain constant feedback on process to make appropriate adjustments. Multiple streams and variable recipes complicate both obtaining and interpreting information on the process continuously. Even if such steps can be automated, it is still necessary to provide a means to manually intervene and override a specific controlled parameter on one or more process streams. This too is clearly difficult to accomplish in an efficient manner.

Even if such equipment is possible, it cost prohibitive to replace existing equipment. It is desirable to have the multi-stream equipment be compatible with a variety of preexisting process equipment and to allow for integration of new equipment therewith to update the production technology in a process facility.

Thus it may be seen that a multi-component food creates many manufacturing problems. A method and apparatus to overcome these problems are highly desirable.

SUMMARY OF THE INVENTION

Among the many objectives of this invention is the provision of a method and an apparatus to individually control densities of up to twenty process streams and provide for the combination of these streams in a manner to yield a final product comprised of specific ratios of each stream as defined by a recipe structure, while controlling the possible addition of added ingredients on a mass basis to create a final mixture of a desired density.

Another objective of this invention is to provide a mechanism to create, edit, store, and recall up to two hundred recipes each having information relative to the desired density, production temperature, pressure, and ratio of each process stream.

Yet another objective of this invention is to provide capability to present certain process information to persons operating the system to indicate the current recipe in use, overall system production rate and setpoint, current and setpoint density for each stream, current and setpoint temperature for each process stream, current and setpoint operating pressures for each process stream, current motor loading and setpoint for each process stream, and current feed rates for added ingredients and the setpoints for these additions.

Still another objective of this invention is to provide a means to manually intervene and override a specific controlled parameter on one or more process streams.

Additionally, an objective of this invention is to provide an apparatus which will accomplish the measurement and control of the above process parameters in a manner which will allow this apparatus to be utilized in highly sanitary applications involving fluids for human use, either orally or parenterally or cosmetically.

Also, an objective of this invention is to provide report or data generation to support required process documentation and record keeping.

A further objective of this invention is to provide data collection points and a mechanism for conveyance of real time process data to effect a statistical process control analysis.

A still further objective of this invention is to provide an apparatus which can measure the flowing liquids and flowing gases in a manner which will allow this apparatus to be utilized in highly sanitary applications involving fluids for oral consumption by a human.

Yet a further objective of this invention is to provide an apparatus for controlled, constant testing or metering of density, in order to provide a reliably uniform product.

Another objective of this invention is to make this system comparable with a variety of preexisting process equipment and to allow for integration with this equipment to update the production technology in a process facility.

These and other objectives of the invention (which other objectives become clear by consideration of the specification, claims and drawings as a whole) are met by providing a method and an apparatus for adjusting the density and ratio of a mixture. The mixture includes at least two variable density fluid streams, each having been processed to yield individual fluid streams of desired densities, and then combined in a manner to achieve controlled ratios of each stream as determined by a recipe structure to produce a final mixture of a desired density. This system further allows injection of solids or other pumpable fluids utilizing the same overall control equipment, compensating for displacement to again yield a final mixture to meet a desired weight per unit volume. This system may be utilized to manufacture a variety of products, especially edible foods such as a frozen topping, marshmallows, ice cream and other comestibles. The overall control system hardware may be extended to further control related aspects of process equipment such as heat exchange functions, flowrate, level, pressure, and similar functions as may be required to achieve economical utilization of the microprocessor capabilities.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Figure 1:
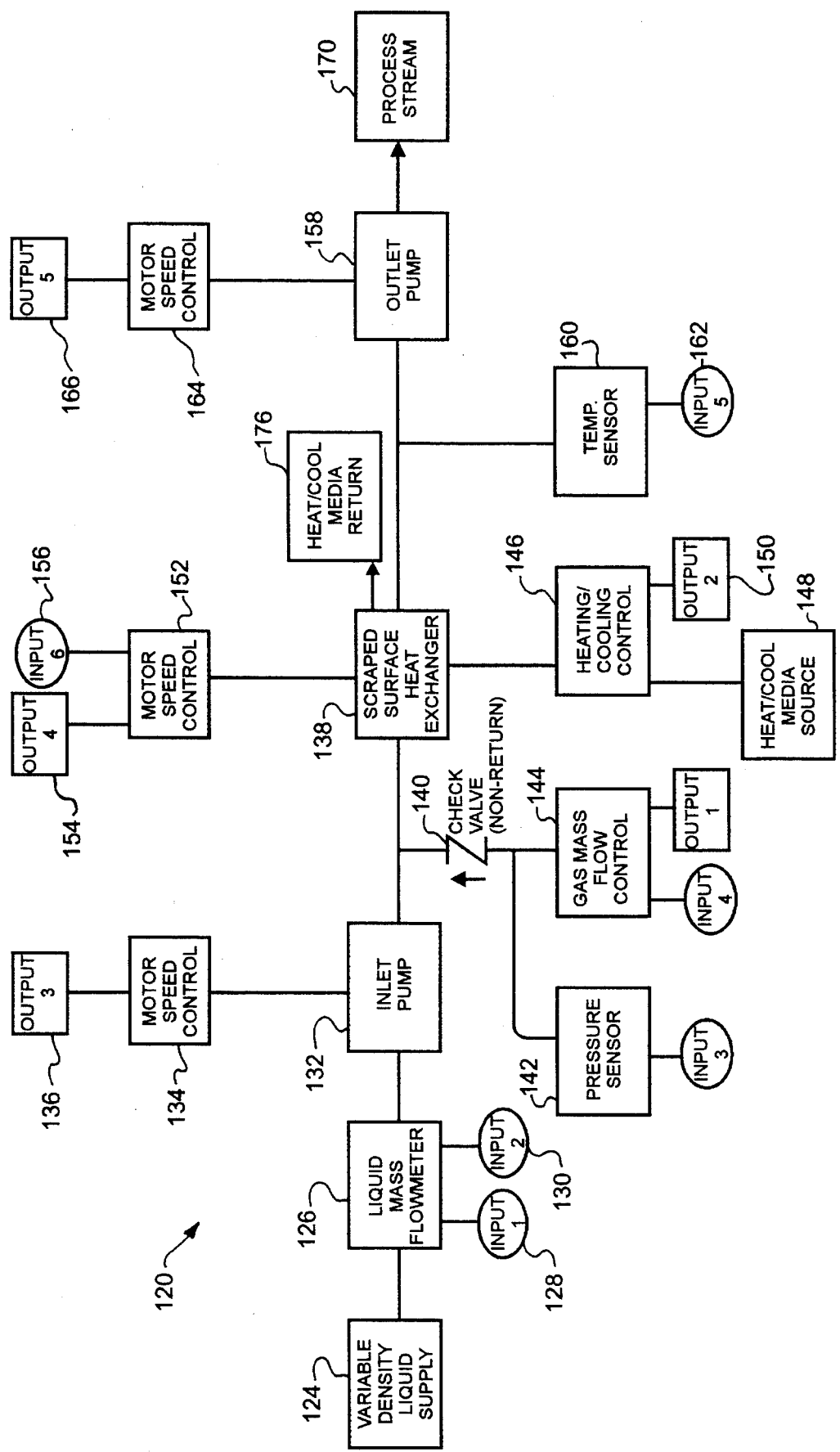
FIG. 1 is a description of the components and their associated control related signals for a single process stream which will process a variable density fluid.

The primary objective of this invention is to provide a method and an apparatus to individually control densities of up to twenty process streams and provide for the combination of these streams in a manner to yield a final product comprised of specific ratios of each stream as defined by a recipe structure and to control the possible addition of added ingredients on a mass basis to create a final mixture having a desired final density, that is a desired weight per unit volume.

From two to twenty process streams may be handled by the apparatus and process of this invention. More preferably, two to fifteen process streams may be utilized. Most preferably, three to ten process streams may be utilized. The process of this invention may also utilize up to 200 recipes to form a food product from the various process streams. By computer selection of the recipes and integrated computer control of the process streams, the desired product may be produced.

Each process stream may be liquid, with one process stream required to be liquid. It is also possible for one or more of the process streams to be gaseous or solid, so long as the final product has the desired density. To mix a series of process streams together and still form a product having a desired and predictable, predetermined density is a fundamental result of the apparatus and the method of this invention.

Desired features of comestible products, especially frozen comestibles are discussed in the prior art. These requirements are even more thoroughly discussed in U.S. patent application Ser. No. 08/095,665; filed Jul. 21, 1993, by the inventor of this application, and incorporated herein by reference. This application is now U.S. Pat. No. 5,325,852.

This invention relates to multiple, variable density fluid streams, each having been processed to yield streams with individually distinct controlled densities. Process streams are then combined to form a fluid or a slurry which can then be formed into a final product. Controls are also utilized for other related process functions.

A fluid stream is measured with a mass flow meter in order to develop a predetermined liquid metering density control system for mixing a liquid having a variable density with an injected gas or liquid to derive a resultant liquid of a desired constant density.

A method and an apparatus are provided for adjusting the density and ratio of a mixture. The mixture includes at least two variable density fluid streams, each having been processed to yield individual fluid streams of desired densities. The individual fluid streams of desired densities are then combined in a manner, to achieve controlled ratios of each stream as determined by a recipe structure and thereby produce a final mixture of a desired density.

This system for the apparatus and method further allows injection of solids or other pumpable fluids to form the final fluid or slurry, while utilizing the same overall control equipment. The control equipment compensates for displacement to again yield a final mixture to meet a desired weight per unit volume. This system may be utilized to manufacture a variety of products, especially edible foods such as a frozen topping, marshmallows, ice cream and other comestibles. The overall control system hardware may be extended to further control related aspects of process equipment such as heat exchange functions, flowrate, level, pressure, and similar functions as may be required to achieve economical utilization of the microprocessor capabilities.

A multiplicity of variable density fluid streams, each having been processed to yield individual fluid streams of desired densities, are combined in a manner to achieve controlled ratios of each stream as determined by a recipe structure to produce a final mixture of a desired density. This system further allows injection of solids or other pumpable fluids utilizing the same overall control equipment, compensating for displacement to again yield a final mixture to meet a desired weight per unit volume. This system may be utilized to manufacture a variety of products, especially edible foods such as frozen toppings, marshmallows, ice creams and other comestibles. The overall control system hardware may be extended to further control related aspects of process equipment such as heat exchange functions, flowrate, level, pressure, and other element as may be required to achieve economical utilization of the microprocessor capabilities.

This invention relates to multiple, variable density fluid streams, each having been processed to yield streams with individually distinct controlled densities. Process streams are then combined to form a final product. Controls are also utilized for other related process functions.

The production of food and beverage products requires application of equipment and instrumentation constructed in a manner to maintain the high degree of sanitation required in the manufacture of products intended for human consumption. This invention contains apparatus constructed to meet these sanitary requirements and is intended to function as either a stand alone apparatus or as an adjunct to apparatus all ready in place.

Several food and beverage products such as desert toppings, ice creams, frozen deserts, puddings, soft drinks, juice based drinks, and a similar food or beverage are comprised of individual components which when mixed in a proper ratio will form a distinct flavor or color or other desired physical property. Control of ingredients comprising the final desired mixture on a continuous basis will enable a producer to develop a consistent product with consistent qualities while maximizing the production capacities of equipment. Often a desired recipe or listing of ingredients will be utilized to determine the proper mixing ratio of one component to another and for specific operating criteria such as heat exchange and final density of each stream and the density of the final mixture. This recipe may change from one flavor or type of product to another. Individual process streams may not require heat exchange functions but instead may require holding or residence times, or other treatment such as pressurization or maintenance of a specific atmosphere.

This invention utilizes a (FIG. 7) Programmable Logic Controller (PLC) to control outputs to process equipment and to receive inputs from process instrumentation and a Cathode Ray Tube (CRT) based Operator Interface (OI) or Personal Computer (PC) as the device utilized to present data to operating personnel and as the means to access real time operating status of process parameters and to store and access historical process data. Further this combination of programmable logic controller and Operator Interface are utilized to create, edit, store, and recall recipes for different types of products to be manufactured on the specific system.

Up to 200 recipe structures may be stored in the systems. These recipes include data specific for each component stream to be continuously blended such as processing temperature, percentage of this component as related to the final mixture, desired density of each component stream, desired density of the final product, and overall quantity of product desired. Further, this system may be interfaced or otherwise linked to supervisory control and data acquisition equipment for plantwide control of multiple systems as described herein.

Production of a desert topping, frozen desert, or pudding type products will include some form of heat exchange as part of their individual production process. Beverage production of soft or juice based drinks may require heat exchange and processing in specialty atmospheres such as carbon dioxide. Regardless of the type of product, the specific process may be described in a production recipe which establishes the specific setpoints for control of each type or portion of the process and the desired density of the final mixture. The description that follows includes a continuous process related to production of frozen products which is based upon the programmable logic controller/operator interface control combination.

Multiple individual streams of variable density fluids are processed to specific controlled densities and blended in a final controlled ratio to yield a final product of desired density. Each variable density stream (FIG. 1) is routed through a Mass Flowmeter which provides an input to the programmable logic controller for the temperature compensated mass rate (pounds or kilograms per minute) and a second input for the density of the stream (pounds per gallon or kilograms per liter). Temperature compensation is built into the mass flowmeter which includes a temperature sensor in the flowtube and whose signal is utilized by the mass flowmeter transmitter to correctly generate the density value as compared to a meter calibration on water standardized to 20 degrees Centigrade. Thus a density value may be accurately presented at a production temperature rather than requiring presentation as a corrected value at standard temperature and pressure.

A single process stream is processed by the addition of air or other gas into a sanitary scraped surface heat exchanger (SSHE), at a controlled pressure and temperature, being discharged as a single process stream of known density. Further this single process stream may be produced at a variable, controlled mass rate so as to become a controlled element in a multiple stream blending of this stream, and other process streams, in a manner to control the ratio of each stream as compared to the final mixture and controlling the density of the final mixture. The variable density liquid enters the sanitary scraped surface heat exchanger via an inlet pump. This inlet pump is of sanitary construction and contains lobe type or similar impellers, which cause the pump to function as a positive displacement type pump.

The pump is driven by an electric motor at a variable speed, hence variable pumping rate, through the use of a motor speed control such as a Variable Frequency AC Drive (VFD) which in turn receives a speed reference signal as an output from the programmable logic controller. Alternatively, the inlet pump may be driven by a motor speed control such as a hydraulic type motor drive mechanism whose displacement may be varied by an output signal from the programmable logic controller to in turn vary the actual pumping rate.

Air is injected at a controlled rate to create a mixture of fluid and air at a desired density. The air injection rate is determined by the recipe density setpoint as compared to the actual density of the incoming process variable density liquid as determined by the mass flowmeter. The manufacture of whipped toppings and frozen deserts may involve the return of partially processed product to the source tank as part of a startup procedure. The return of aerated product to a source tank has the effect of diluting or dropping the density of the overall quantity of product in the tank.

Thus, a variable density liquid is often created as a result of a manufacturing method and this system of mass measurement will correctly read the incoming density and calculate the desired amount of air. The air stream is provided at a pressure at least 700 grams per square centimeter (10 pounds per square inch) higher than the process stream and is injected and controlled by a gas mass flow control which accepts a control setpoint signal from the programmable logic controller and as a result controls the air feed rate at the setpoint.

Further the gas mass flow control will provide an output signal to the programmable logic controller as an input which is reflective of the actual delivery mass rate of the air stream. This signal is used by the programmable logic controller and operator interface to monitor the system function, display air mass delivery rate, and deviation from the desired setpoint. Further, the air stream is injected prior to the sanitary scraped surface heat exchanger via a non-return or check valve to assure that the liquid stream does not enter the air stream or associated gas mass flow control.

A pressure sensor is tapped into the air stream in such a manner as to provide a signal to the programmable logic controller which is indicative of the actual pressure of the air at the point of injection. This pressure is also that of the actual process stream and is used as a sensor by the programmable logic controller to control the pressure of the process stream as it enters the sanitary scraped surface heat exchanger. This pressure control is effected by controlling an outlet pump similarly constructed as the inlet pump with motor speed control in a manner similar to that of the inlet pump based upon an output signal from the programmable logic controller to provide a speed reference.

Production of toppings and frozen deserts may result in wide ranges of air being injected into the stream. Thus, the actual volume of a given process stream may be significantly higher than the variable density liquid supply. The overall pressure of a process stream at the time of heat exchange will alter the actual air cell size and thus control of this parameter is desirable.

A pressure setpoint may be designated in a recipe for a given process stream and may be controlled by operating the outlet pump at a speed which will maintain the desired pressure. The overall mass rate of the process stream may be determined by the recipe and this rate is controlled by adjusting the speed of the inlet pump with the outlet pump speed varying as required to reflect an overall process stream rate while maintaining the desired system pressure.

Heat exchange functions also may be controlled by the programmable logic controller and at setpoints as specified in a recipe. In some cases it is desirable to vary the rate of the scraping action or beating action of the sanitary scraped surface heat exchanger. A motor speed control of either a VFD or hydraulic variety may be attached to the drive of the sanitary scraped surface heat exchanger and will operate at a speed as determined by the recipe through an output from the programmable logic controller.

Further a feedback signal is available from the drive mechanism to reflect the actual speed of the sanitary scraped surface heat exchanger and of the electrical current or power required to operate at the setpoint. The actual control of heating or cooling functions is dependent on the programmable logic controller receiving a signal from a sanitary temperature sensor which provides a signal as an input to the programmable logic controller which indicates the current temperature of the process stream as it exits the sanitary scraped surface heat exchanger.

This signal may be compared to the desired temperature as specified in the recipe for the process stream and an output from the programmable logic controller altered to the heating/cooling control to yield a desired operating temperature from the sanitary scraped surface heat exchanger. In the case of frozen products, the desired temperature for the exit process stream may cause a phase change to occur within the sanitary scraped surface heat exchanger and accordingly will cause the drive mechanism to consume higher levels of power.

Prevention of motor or drive overload is accomplished by cascading a control of the temperature with the control of the cooling mechanism so as to limit the temperature which may be achieved at a given process mass rate to a maximum motor loading. Thus with a fixed amount of heat exchange surface, a freezing process may cause excessive loads to occur on a drive motor. Therefore, the temperature setpoint is automatically adjusted to prevent overload and possible freezeup of the sanitary scraped surface heat exchanger.

The programmable logic controller will alarm the operator that a desired process control setpoint is not being achieved due to equipment limitations. The operator may then elect to slow the overall process rate to reach a desired temperature without overloading the motor. The maximum power or current rating of the drive motor is entered in the programmable logic controller as a fixed, non recipe parameter.

An individual process stream of known density and known mass rate and known temperature is thusly manufactured and is available as a process stream for either final filling and packaging of a product or may be combined with other process streams, similarly manufactured, in known mass rates to yield a new mixture of known proportions and density which may then be filled and otherwise packaged as a final product.

Multiple individual process streams (FIG. 2) may be produced, each having a known mass rate, known density, and known temperature; and then combined into a final product in such a manner as to control the ratio of the process streams, one to another. These factors in turn control the attributes of the final product for filling and packaging.

In some cases, the individual process streams may be thoroughly mixed prior to filling and packaging, or in other cases, each stream may maintain its identity in the final package. The control system will control the mass rates of the individual process streams to yield a final product of known consistency and known density.

Some products further require the addition of certain additives which, in and of themselves, are manufactured in separate processes. In some cases, these additives are of a consistency which will allow their addition to a product to be made utilizing equipment associated with the handling of fluids. In other cases, the additive is of a non-pumpable or otherwise solid characteristic which requires handling by equipment associated with the handling of non-pumpable ingredients.

The design of certain products to require the addition of such additives, either pumpable or non-pumpable is accomplished by the development of feeding apparatus to perform the feeding and control in conjunction with a recipe. The recipe will establish the required mass feed rate of the additive and control this parameter to yield a final product of known consistency and known density. A change in the recipe requires an adjustment in all of the processing parameters.

Such a mass based fluid feeder (FIG. 5) consists of a vessel containing the material to be fed and an associated positive displacement feed pump. This feed pump motor is equipped with a speed control device which accepts a signal from the programmable logic controller to determine the speed of the pump and, as a result, controls the rate at which the pump delivers the pumpable additive. The additive is then transferred through a mass flowmeter and into the injection/mixing apparatus, which is equipped with a mixing chamber, mixer drive motor, and mixer drive motor speed control.

The mixing chamber is of sanitary construction and provides a point where pumpable additives are injected into either a single process stream or into a stream comprised of several individual process streams. The desired recipe will contain the ratio of additive required and the additive mass flowmeter will provide the mass feed rate and density information of the pumpable additive to the programmable logic controller.

The programmable logic controller will then determine the required mass feed rate and will adjust the additive feed pump speed to maintain the mass feed rate setpoint. Further since the additive displaces primary product, the mass of additive required will be calculated and the densities of individual process streams will be appropriately adjusted to automatically yield a final mixture of desired density.

Also, the mixer drive motor may have an associated recipe based setpoint for operating speed. The rate at which this mixer turns will establish a desired number of swirls and other patterns of pumpable additive in frozen product streams.

Figure 6:
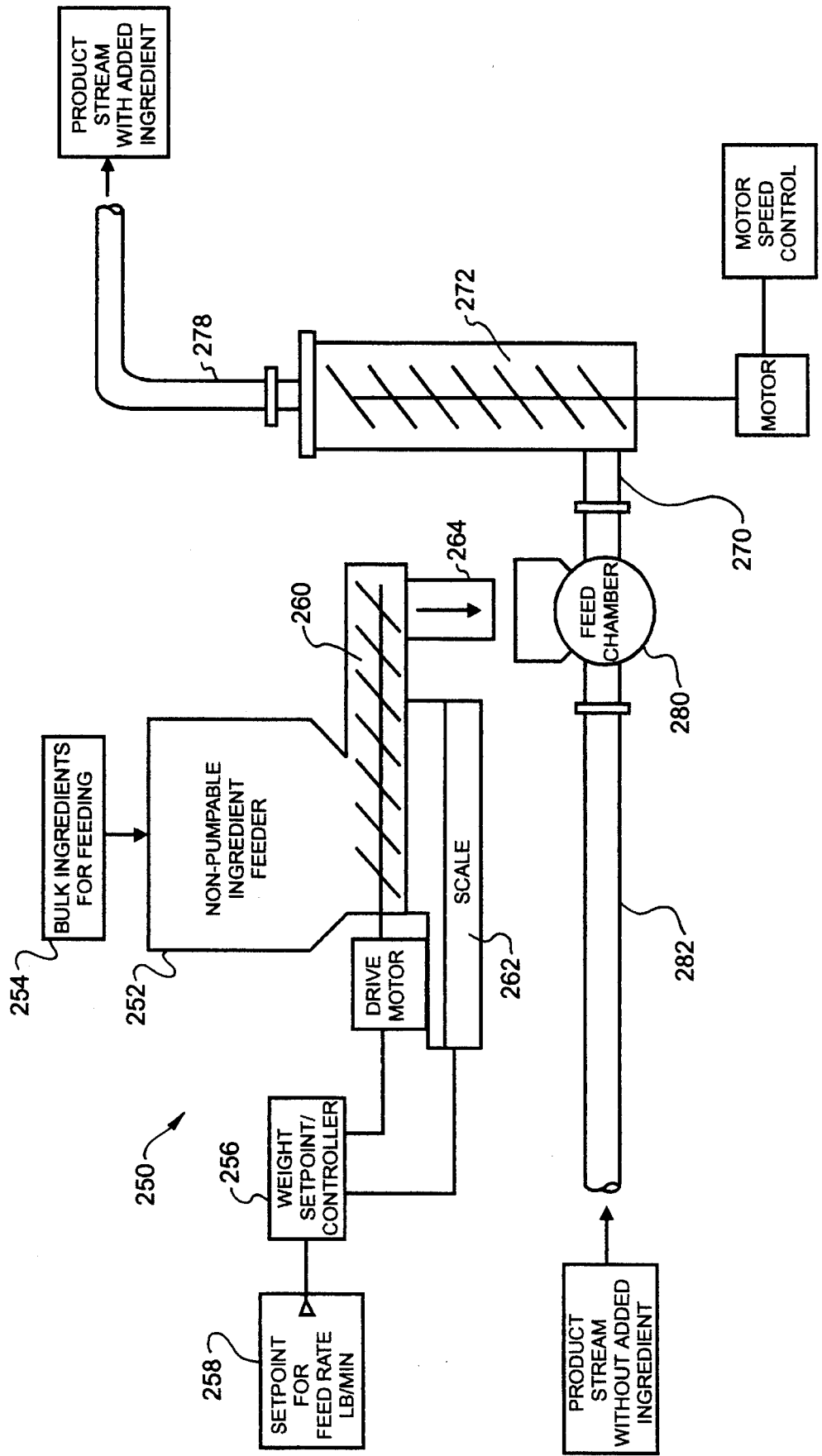
FIG. 6 depicts a mass based ingredient feeder including scale mechanism, feed mechanism, and mixing mechanism.

Alternatively, an additive may be of a non-pumpable product such as whole fruit, candies, cookies, nuts, and a similar additive, which may be required as additives to a frozen desert. These types of non-pumpable products may be fed by a mass based ingredient feeder (FIG. 6). Such a feeder may be used in conjunction with conventional fruit/ingredient feeders commonly utilized in the manufacture of food products. The conventional equipment include a mechanism to allow frozen products to have ingredients injected without loss of product to atmosphere and further provide a mixing means to create a homogeneous mixture. The mass based ingredient feeder is further equipped with an auger based feeding mechanism which is mounted on a scale platform.

The scale is connected to a weigh setpoint/controller, which may accept input signals from the programmable logic controller for the desired mass feedrate and will provide an output to a programmable logic controller input which will indicate the current feedrate for the non-pumpable product. The weight setpoint/controller connects directly to an auger speed control and auger motor.

As a recipe may require that certain non-pumpable ingredients be fed into a product stream, the programmable logic controller will calculate the desired mass feed rate and will transmit this setpoint to the weigh setpoint/controller. As the overall process mass rate may vary, the programmable logic controller will automatically calculate the desired mass delivery rate for the additive.

The additive may be of a density that is greater than or less than that of the primary product stream. Also, as with pumpable additives, the additive will displace an amount of the primary process stream. The system will automatically calculate the desired amount of additive per the recipe and will adjust the mass feed rate of all streams to maintain the final overall mass rate and desired density.

Figure 3:
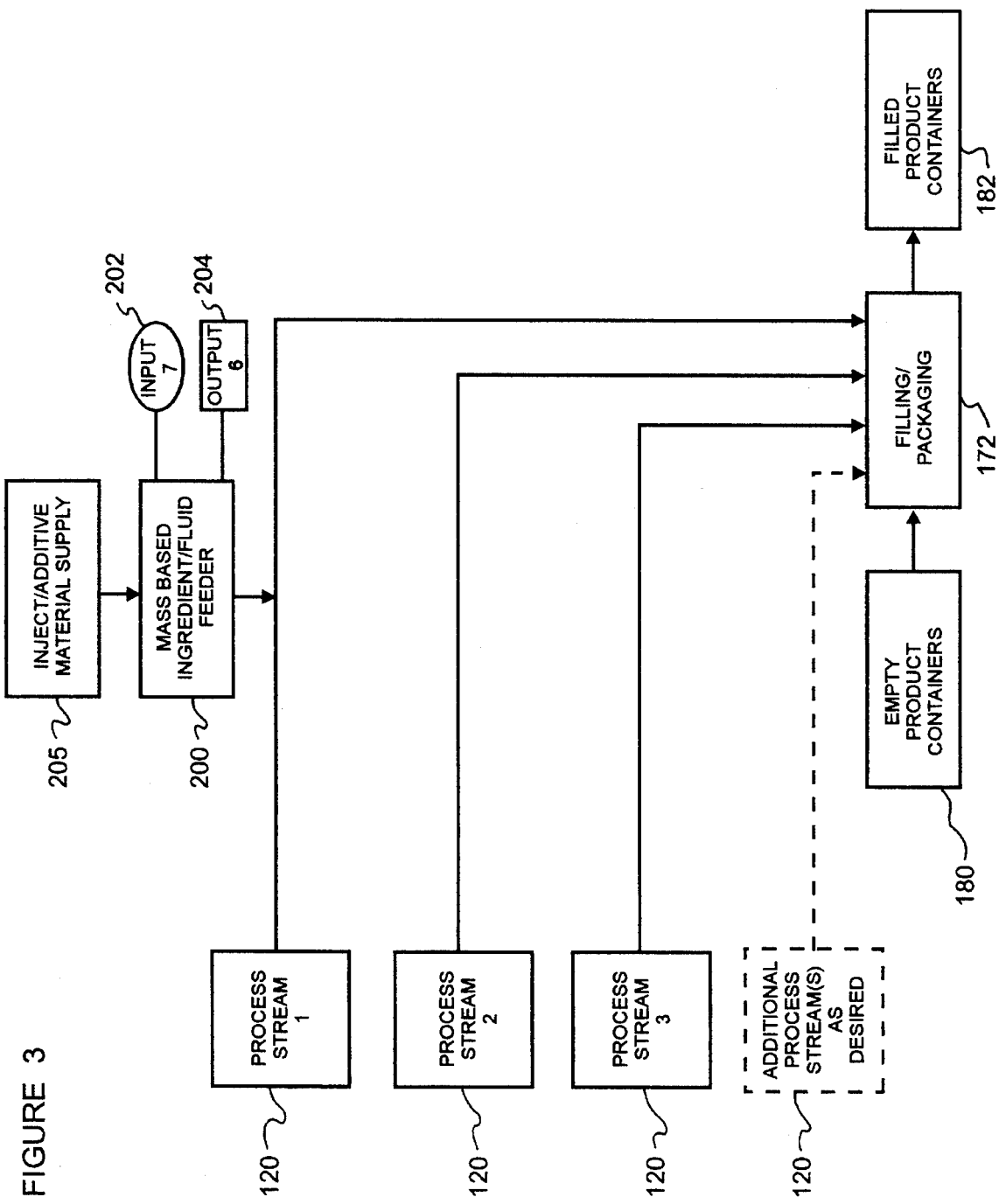
FIG. 3 depicts multiple individual process streams being directed to filling/packaging as separate and distinct streams with a mass based ingredient/fluid feeder injecting additive materials into one process stream.
Figure 4:
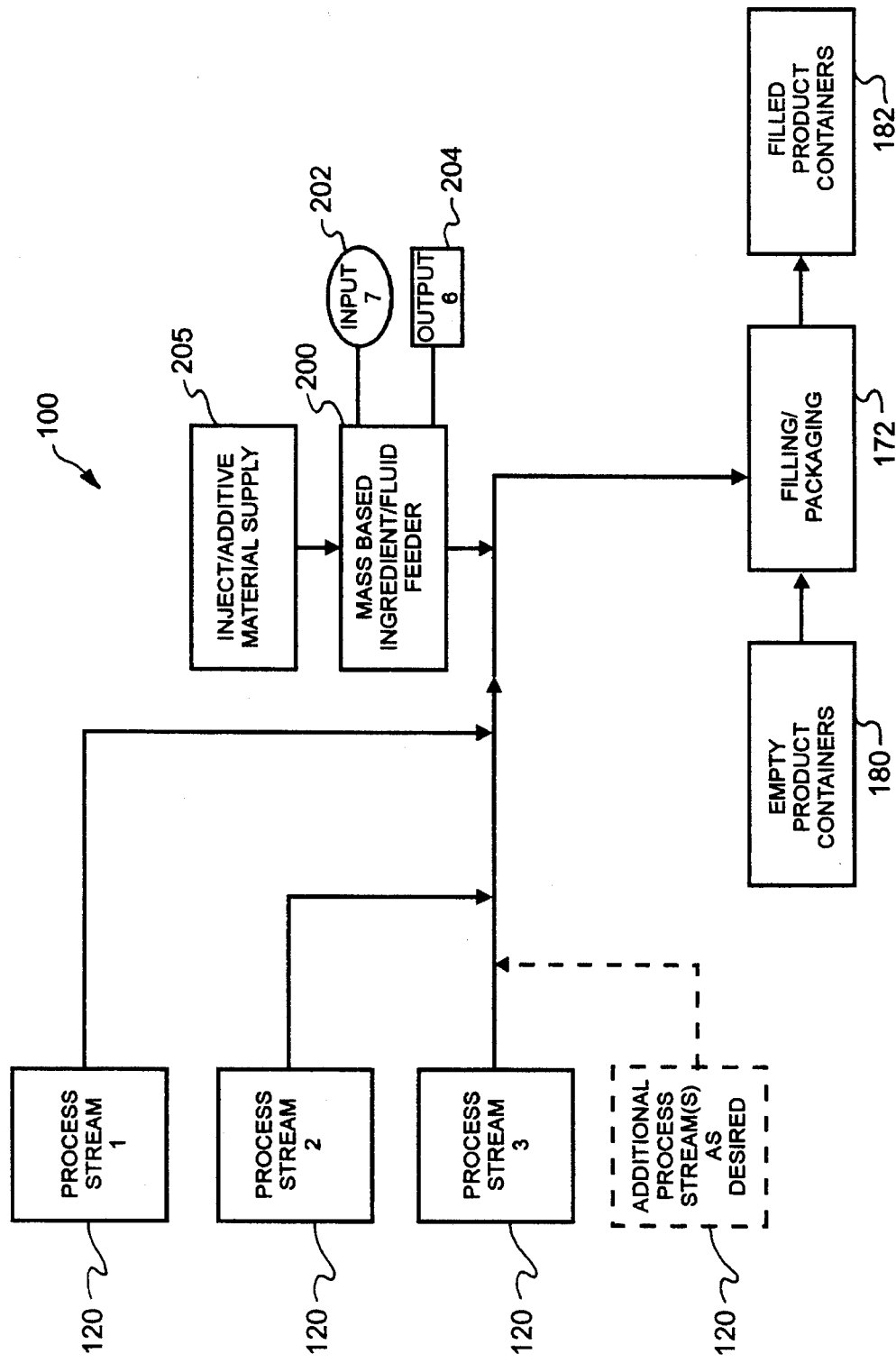
FIG. 4 depicts multiple individual process streams combining to form a single stream being directed to filling or packaging assembly with a mass based ingredient or fluid feeder injecting additive materials into the combined stream.

The addition of required additives may be into a single process stream (FIG. 3) or alternatively may be in such a manner as having multiple process streams combined into single stream into which the additive is injected (FIG. 4). Either method or methods where multiple feeders simultaneously may serve a single process stream or whereby different additives are simultaneously added to a common process stream are capable of being supported by the control system.

Figure 2:
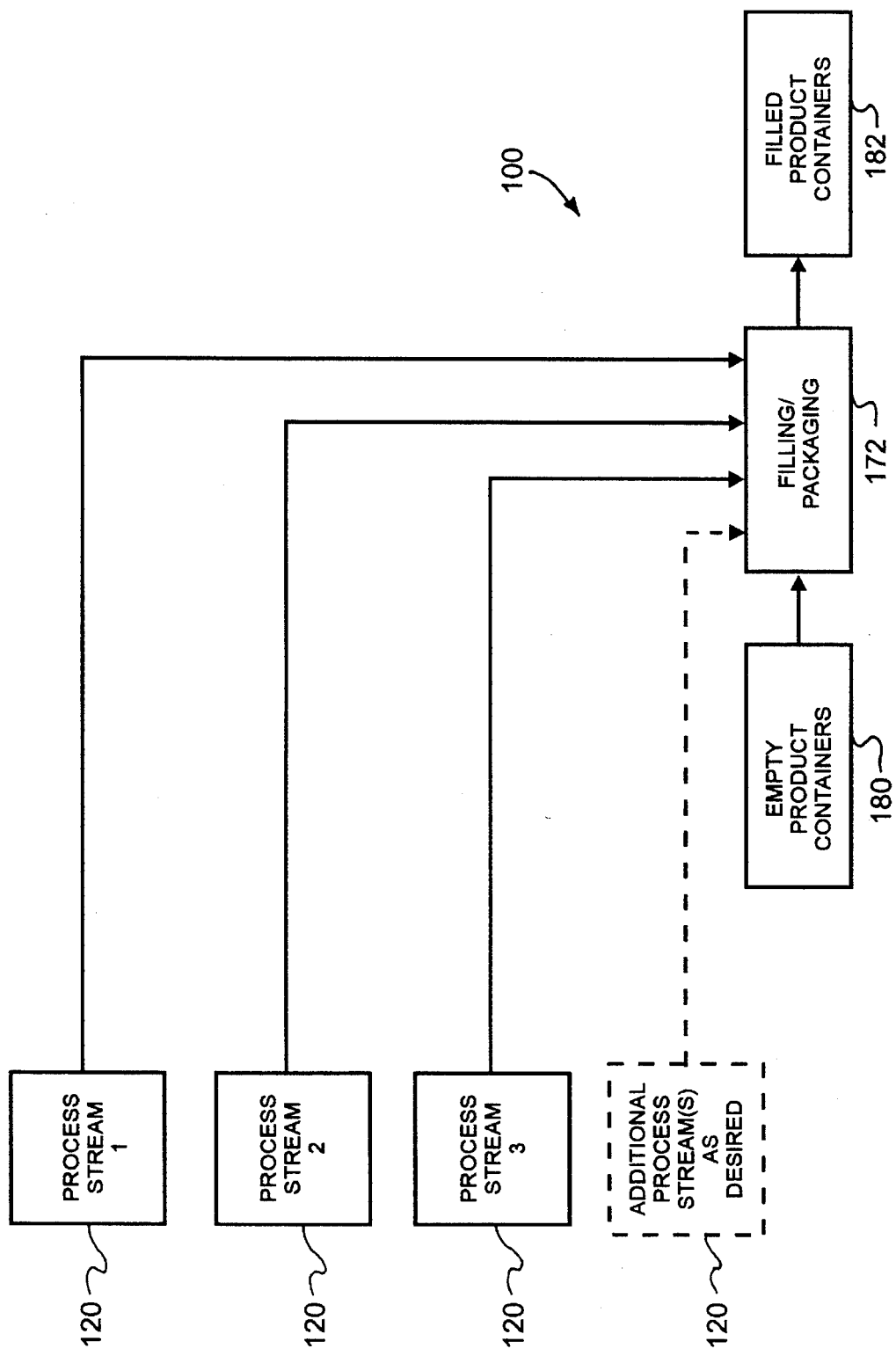
FIG. 2 depicts multiple individual process streams being directed to filling/packaging as separate and distinct streams.

With the consideration of FIG. 1 and FIG. 2, the basis of this invention, that a food forming apparatus 100 coordinates a plurality of a single stream apparatus 120 to form a food of desired density, becomes clear. A variable density liquid supply or fluid 124 is processed into food by the single stream apparatus 120.

This variable density liquid supply 124 is fed to a liquid mass flow meter 126 which has readouts from a first input 128 and a second input 130. These readouts permit a constant determination of the density of the liquid supply.

From the liquid mass flow meter 126, the liquid supply flows to the inlet pump 132. Attached to the inlet pump 132 is a motor speed control 134 and a first output 136 capable of reading the motor speed control 134. As the fluid 124 passes through the inlet pump 132 toward a scraped heat surface exchanger 138, a check valve 140 of the non-return type is connected therebetween to a pressure sensor 142 and a gas mass flow control 144.

The pressure sensor 142 and gas mass flow control 144 are operably connected to check valve 140. The second input 172 reads the pressure sensor 142, which in turn reads the gas flow from gas mess flow control 144. Both pressure sensor 142 and gas mass flow control 144 feeds into the fluid 124 thorough check valve 140 to form a gas fluid mixture which is fed to the scraped surface heat exchanger 138.

Attached to the scraped surface heat exchanger 138 is a heating and cooling control 146. A heating or cooling media source 148 services attached to the heating and cooling control 146. There is a third output 150 connected to the heating and cooling control 146 for closely checking and adjusting the process within the desired parameters. There is also a recycling heat/cool media return 176 connected to scraped surface heat exchanger 138 for recycling spent air back to the heat/cool media source 148.

There is also a second motor speed control 152 connected to the scraped surface heat exchanger 138. The fourth output 154 and the fourth input 156 control and read-out on the motor speed control 152 for the surface heat exchanger 138. As the fluid and gas mixture passes from the scraped surface heat exchanger 138 toward an outlet pump 158, a temperature sensor 160 with an fifth input reader 162 is connected therebetween to achieve the desired control thereof. The outlet pump 158 also has a motor speed control 164 connected to a fourth output 166. The inputs and the outputs are coordinated by computer within the desired parameters to achieve the desired results to form a process stream 170.

A plurality of process streams 170 can be combined as shown in FIG. 2 to a packaging system 172 which receives empty product containers 180 and results in filled product containers 182. If an additional process stream 170 is desired, it can be used. In fact, a plurality of additional process streams 170 may be used.

Referring now to FIG. 3, a multi-process stream 120 system may have injected into one of the process streams an additive material. Typical of the added materials could be chocolate chips, strawberries or other suitable solid foods for comestibles.

This material is fed into a mass based ingredient fluid feeder 200. There is a seventh input 202 and sixth output 204 for providing information to test the rate of fluids solids being added to the process stream 170 and to adjust the fluid through the fluid feeder 200 to form the desired density for the product stream and flowability of the product stream as desired. The additive can be injected into one stream 170.

In FIG. 4, it can be seen that FIG. 3 may be modified. All the streams 170 can be combined, followed by the injection of fluid from the fluid feeder 200 into the combined streams 170. In this fashion, a different method as desired may be achieved to get the an added fluid into the desired food.

Figure 5:
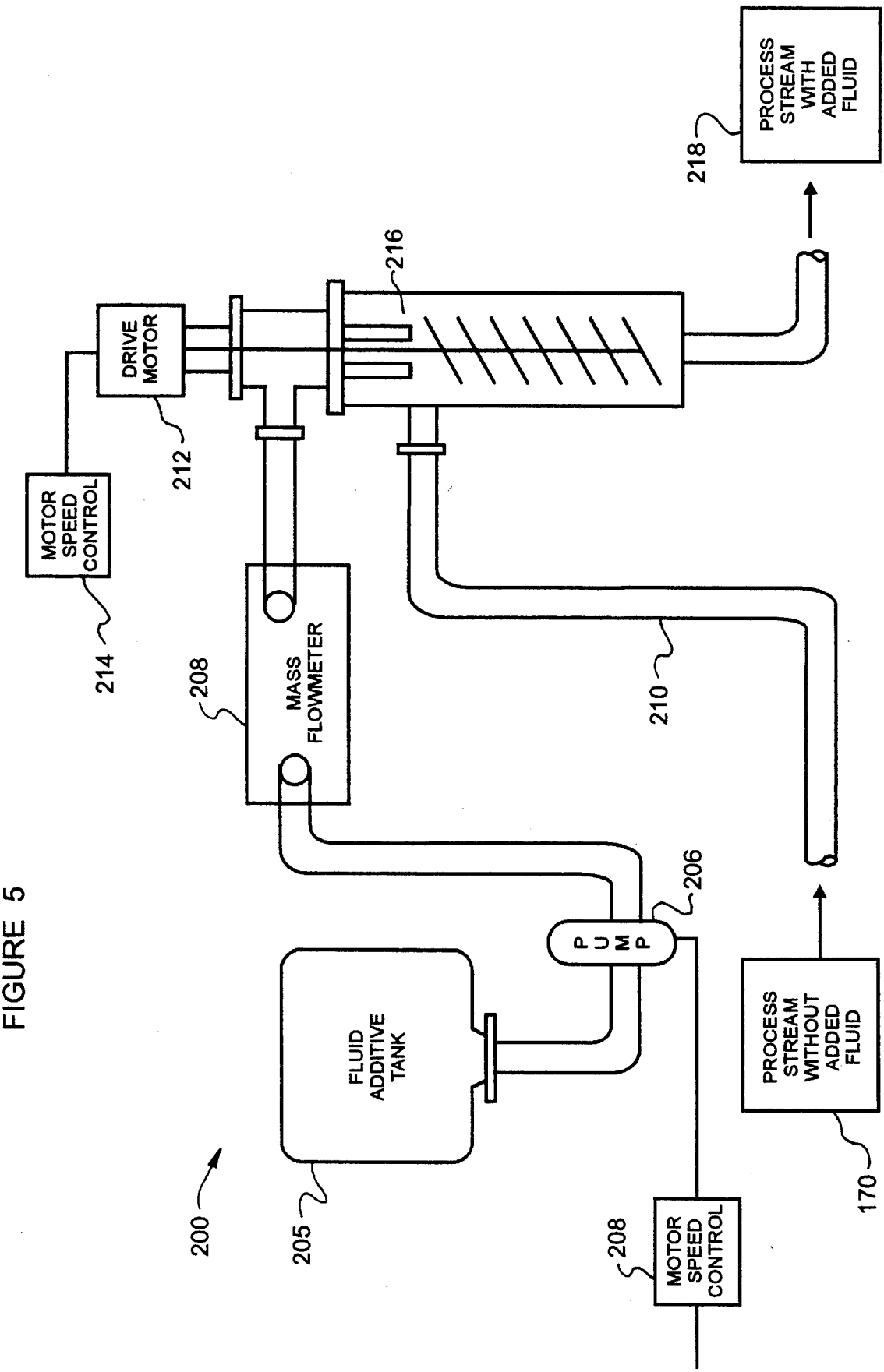
FIG. 5 depicts a mass based fluid feeder including a source container or vessel, a transfer pump, a mass flowmeter, and a feeder or mixing apparatus.

In FIG. 5, the mass based fluid feeder 200 is more thoroughly described. Basically, a hopper 204 for the fluid feeds the fluid into an input chamber 205 with an output readout 208. The feeding pipes 210 direct the fluid to a treatment chamber 212, which then forces the fluid to a in-line mixer 206, where it is combined with a fluid stream 170 to form mixture 218, which is a process stream with added fluid.

In FIG. 6, the bulk ingredient feeder 250 is more thoroughly described. Bulk ingredients are fed from the bulk ingredient feeder 250 into a process stream 170 or a mixture of process streams 170. Basically, a bulk hopper 252 receives the bulk ingredients from bulk input 254. The bulk hopper 252 in connected in a standard fashion to determine a set point 258 for the feeding of bulk solids into an screw feed chamber 260. A scale 262 connected to the screw feed chamber 260 and a weight setpoint controller 256 is connected to a screw feed drive motor 268 to adjust the bulk feeding as desired.

The bulk ingredient is fed from screw feed chamber 260 into a conveying tube 264, which in turn leads to stream hopper 266 into a stream 170. The product stream 170 with bulk ingredient forms a slurry, which is fed through slurry pipe 270 to a slurry mixing chamber 272. The slurry recovery pipe 278 leads from the slurry mixing chamber 272 to the next process step.

Figure 7:
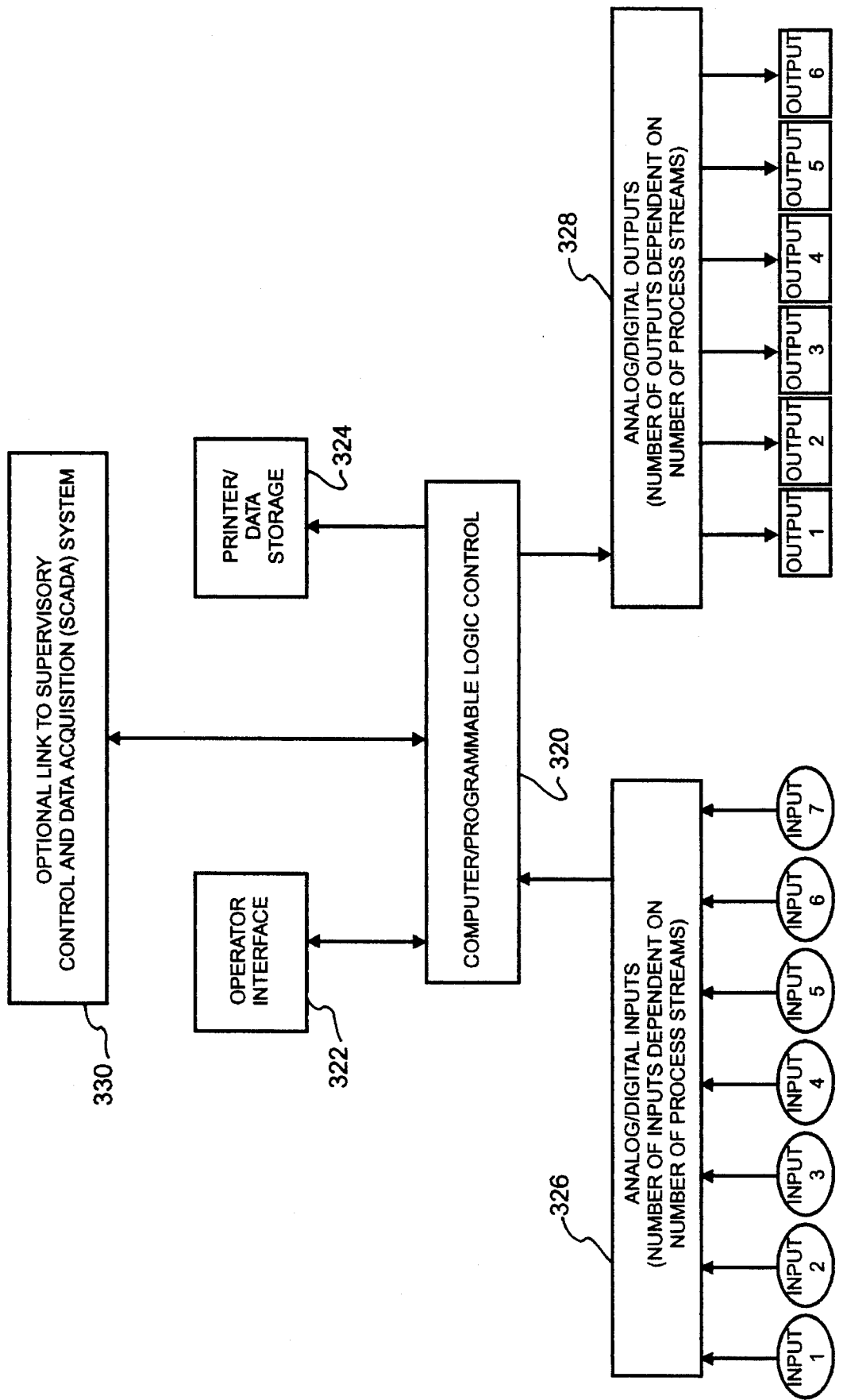
FIG. 7 depicts a typical process stream control overview including inputs or outputs and associated control system components.

A computer 300 in FIG. 7 provides controls to provide the adjust all parts of the process within the scope of desired recipe. The personal computer 300 includes an operator interface 322, and a printer and storage assembly 324 of standard form. The analog digital inputs 326 from the number of process streams are fed into the computer.

The analog digital outputs 328 combined with the storage in the interface and the recipe inputs permitted from the operator interface 322 to the programmable logic control 320 permits a total control of all process aspects. It is also possible to link the computer to a supervisory system commonly known as SCADA 330 and achieve even a more careful inventory review of the process and products.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. An apparatus for forming a multi-component having predictable density comprising:
   a) a first fluid stream forming device for forming a first fluid including a first means to adjust a density of a fluid stream;
   b) the means to adjust including means to determine a viscosity and a density for the fluid stream, means to adjust a viscosity and a density for the fluid stream, means to add a component to the fluid stream to form a mixture and means to determine the viscosity and density of the mixture;
   c) a second fluid stream forming device for forming a second fluid including a second means to adjust a density of a fluid stream;
   d) the second means to adjust being similar to the first means to adjust;
   e) means to integrate the first fluid stream with the second fluid to form a product.

2. The apparatus of claim 1 further comprising:
   a) means to control a ratio of the first fluid stream relating to the second fluid stream; and
   b) means to adjust the ratio of the first fluid stream to the second fluid to form the product.

3. The apparatus of claim 2 further comprising:
   a) means to mix up to 20 of the fluid stream in forming the product;
   b) means to control the ratio of each fluid in the product in adjusting a final density of the product;
   c) means for adding a solid component to fluid stream; and
   d) means for controlling apparatus with a programmable logic controller.

4. The apparatus of claim 3 further comprising:
   a) the programmable logic controller including a control output for each stream and a control input for each stream;
   b) the programmable logic controller including a cathode ray tube based operator interface for presenting data desired to determine operating status of process parameters and to store and access historical process data;
   c) the programmable logic controller including a recipe function to simplify changing of the product; and
   d) the programmable logic controller including a heat exchange control function.

5. The apparatus of claim 4 further comprising:
   a) the programmable logic controller including a temperature sensor and a mass flowmeter;
   b) the mass flowmeter including means to use the temperature to generate a desired density value;
   c) the single process stream being processed in a sanitary scraped surface heat exchanger at a controlled pressure and temperature; and
   d) the single process stream being discharged as a single process stream of known density.

6. The apparatus of claim 4 further comprising:
   a) the first fluid stream and the second fluid stream being processed with a plurality of additional fluid streams;
   b) an input and an output being sent to the programmable logic controller for each fluid stream to control the density thereof;
   c) the fluid streams combining to form a mixture;
   d) the mixture being recovered to form a product;
   e) means to determine the density of the mixture; and
   f) means to adjust the density of the mixture.

7. The apparatus of claim 6 further comprising means to add at least one solid to the first fluid stream.

8. The apparatus of claim 6 further comprising means to add at least one solid to the mixture.

* * * * *